US006810466B2

(12) United States Patent
Henry et al.

(10) Patent No.: US 6,810,466 B2
(45) Date of Patent: Oct. 26, 2004

(54) MICROPROCESSOR AND METHOD FOR PERFORMING SELECTIVE PREFETCH BASED ON BUS ACTIVITY LEVEL

(75) Inventors: G. Glenn Henry, Austin, TX (US); Rodney E. Hooker, Austin, TX (US)

(73) Assignee: IP-First, LLC, Fremont, CA (US)

(*) Notice: Subject to any disclaimer, the term of this patent is extended or adjusted under 35 U.S.C. 154(b) by 343 days.

(21) Appl. No.: 10/175,383

(22) Filed: Jun. 18, 2002

(65) Prior Publication Data

US 2003/0088740 A1 May 8, 2003

Related U.S. Application Data

(60) Provisional application No. 60/345,462, filed on Oct. 23, 2001.

(51) Int. Cl.[7] ............................................. G06F 12/08
(52) U.S. Cl. ..................... 711/137; 711/141; 711/144; 711/213; 712/233; 712/237; 712/239
(58) Field of Search ................................. 711/137, 141, 711/144, 213; 712/233, 237, 239

(56) References Cited

U.S. PATENT DOCUMENTS 5,787,475 A * 7/1998 Pawlowski .................. 711/137
5,941,981 A * 8/1999 Tran ........................... 712/207
6,470,427 B1 * 10/2002 Arimilli et al. ............. 711/137
6,484,239 B1 * 11/2002 Hill et al. ................... 711/137

OTHER PUBLICATIONS

IA-32 Intel Architecture Software Developer's Manual, vol. 2: Instruction Set Reference, 2001, pp. 3-600 to 3-601.

* cited by examiner

Primary Examiner—T Nguyen
(74) Attorney, Agent, or Firm—E. Alan Davis; James W. Huffman

(57) ABSTRACT

A microprocessor that selectively performs prefetch instructions based upon an indication of future processor bus activity and cache line status. The microprocessor includes a programmable threshold register for storing a threshold value. The threshold value is such that if the depth of bus requests queued in the bus interface unit of the microprocessor is greater than the threshold value, this condition indicates a high likelihood of a high level of bus activity in the near future, for example due to a workload change. If a prefetch instruction cache line address misses in the processor cache, then the line is not prefetched from external memory unless the line may be supplied from one level of internal cache to a lower level of internal cache. However, even in this case the line is not transferred internally if the line status is shared.

34 Claims, 2 Drawing Sheets

Microprocessor for Performing Selective Prefetching

Microprocessor for Performing Selective Prefetching

Selective Prefetch Operation

MICROPROCESSOR AND METHOD FOR PERFORMING SELECTIVE PREFETCH BASED ON BUS ACTIVITY LEVEL

This application claims priority based on U.S. Provisional Application Ser. No. 60/345,462, filed Oct. 23, 2001, entitled SELECTIVE L2 HIT-C5B.

FIELD OF THE INVENTION

This invention relates in general to the field of prefetch instructions in microprocessors, and more particularly to a microprocessor that selectively performs prefetch instructions depending upon the current level of processor bus activity.

BACKGROUND OF THE INVENTION

Most modern computer systems include a microprocessor that performs the computation necessary to execute software programs. The computer system also includes other devices connected to the microprocessor such as memory. The memory stores the software program instructions to be executed by the microprocessor. The memory also stores data that the program instructions manipulate to achieve the desired function of the program.

The devices in the computer system that are external to the microprocessor, such as the memory, are directly or indirectly connected to the microprocessor by a processor bus. The processor bus is a collection of signals that enable the microprocessor to transfer data in relatively large chunks, such as 64 or 128 bits, at a time. When the microprocessor executes program instructions that perform computations on the data stored in the memory, the microprocessor must fetch the data from memory into the microprocessor using the processor bus. Similarly, the microprocessor writes results of the computations back to the memory using the processor bus.

The time required to fetch data from memory or to write data to memory is typically between ten and one hundred times greater than the time required by the microprocessor to perform the computation on the data. Consequently, the microprocessor must inefficiently wait idle for the data to be fetched from memory.

To minimize this problem, modern microprocessors include a cache memory. The cache memory, or cache, is a memory internal to the microprocessor—typically much smaller than the system memory—that stores a subset of the data in the system memory. When the microprocessor executes an instruction that references data, the microprocessor first checks to see if the data is present in the cache and is valid. If so, the instruction can be executed immediately since the data is already present in the cache. That is, the microprocessor does not have to wait while the data is fetched from the memory into the cache using the processor bus. The condition where the microprocessor detects that the data is present in the cache and valid is commonly referred to as a cache hit.

Many cache hits occur due to the fact that commonly software programs operate on a relatively small set of data for a period of time, operate on another relatively small data set for another period of time, and so forth. This phenomenon is commonly referred to as the locality of reference principle. If the program exhibits behavior that substantially conforms to the principle of locality of reference and the cache size is larger than the data set size during a given period of time, the likelihood of cache hits is high during that period.

However, some software programs do not exhibit behavior that substantially conforms to the principle of locality of reference and/or the data sets they operate upon are larger than the cache size. These programs may require manipulation of a large, linear data set present in a memory external to the microprocessor, such as a video frame buffer or system memory. Examples of such programs are multimedia-related audio or video programs that process video data or audio wave file data. Typically, the cache hit rate is low for such programs.

To address this problem, some modern microprocessors include a prefetch instruction in their instruction sets. The prefetch instruction instructs the microprocessor to fetch a cache line specified by the prefetch instruction into the cache. A cache line is the smallest unit of data than can be transferred between the cache and other memories in the system, and a common cache line size is 32 or 64 bytes. The software programmer places prefetch instructions at strategic locations in the program to prefetch the needed data into the cache. Consequently, the probability is increased that the data is already in the cache when the microprocessor is ready to execute the instructions that perform computations with the data.

In some microprocessors, the cache is actually made up of multiple caches. The multiple caches are arranged in a hierarchy of multiple levels. For example, a microprocessor may have two caches, referred to as a first-level (L1) cache and a second-level (L2) cache. The L1 cache is closer to the computation elements of the microprocessor than the L2 cache. That is, the L1 cache is capable of providing data to the computation elements faster than the L2 cache. The L2 cache is commonly larger than the L1 cache, although not necessarily.

One effect of a multi-level cache arrangement upon a prefetch instruction is that the cache line specified by the prefetch instruction may hit in the L2 cache but not in the L1 cache. In this situation, the microprocessor can transfer the cache line from the L2 cache to the L1 cache instead of fetching the line from memory using the processor bus since the transfer from the L2 to the L1 is much faster than fetching the cache line over the processor bus. That is, the L1 cache allocates a cache line, i.e., a storage location for a cache line, and the L2 cache provides the cache line to the L1 cache for storage therein. The pseudo-code below illustrates a conventional method for executing a prefetch instruction in a microprocessor with a two-level internal cache hierarchy. In the code, a no-op denotes "no operation" and means that the microprocessor takes no action on the prefetch instruction and simply retires the instruction without fetching the specified cache line.

if (line hits in L1)
   no-op; /* do nothing */
else if (line hits in L2)
   supply requested line from L2 to L1;
else
   fetch line from processor bus to L1;

Microprocessors include a bus interface unit (BIU) that interfaces the processor bus with the rest of the microprocessor. When functional blocks within the microprocessor want to perform a transaction on the processor bus, they issue a request to the BIU to perform the bus transaction. For example, a functional block within the microprocessor may issue a request to the BIU to perform a transaction on the processor bus to fetch a cache line from memory. It is common for multiple bus transaction requests to be pending, or queued up, in the BIU. This is particularly true in modern microprocessors because they execute multiple instructions in parallel through different stages of a pipeline, in a manner similar to an automobile assembly line.

A consequence of the fact that multiple requests may be queued up in the BIU is that a request in the queue must wait for all the other requests in front of it to complete before the BIU can perform that request. Consequently, if a bus transaction request is submitted to the BIU for a prefetch of a cache line, the possibility exists that the prefetch request may cause a subsequent request associated with a more important non-prefetch instruction to wait longer to be performed on the bus than it would otherwise have had to, thereby possibly degrading overall performance.

Commonly, a prefetch instruction is by definition a hint to prefetch the cache line rather than an absolute command to do so. That is, the microprocessor may choose to no-op the prefetch instruction in certain circumstances. However, conventional microprocessors do not consider the likelihood that performing a prefetch that generates additional processor bus activity will degrade performance. Therefore, what is needed is a microprocessor that selectively performs prefetch instructions based on this consideration.

SUMMARY

The present invention provides a microprocessor and method that compares a current level of bus activity with a predetermined threshold value as a prediction of future bus activity and selectively performs prefetch instructions based on the prediction. Accordingly, in attainment of the aforementioned object, it is a feature of the present invention to provide a microprocessor for selectively performing a prefetch instruction. The microprocessor includes a bus interface unit (BIU), which performs bus transactions on a bus coupling the microprocessor to a memory. The microprocessor also includes a predictor, coupled to the BIU, that generates a prediction of whether prefetching a cache line specified by the prefetch instruction will delay subsequent bus transactions on the bus. The microprocessor also includes control logic, coupled to the predictor, which selectively does not prefetch the cache line if the prediction indicates prefetching the cache line will delay the subsequent bus transactions.

In another aspect, it is a feature of the present invention to provide a microprocessor for selectively performing a prefetch instruction. The microprocessor includes a bus interface unit (BIU), which indicates a current level of bus requests for the BIU to perform on a bus coupling the microprocessor to a memory. The microprocessor also includes a register, coupled to the BIU, which stores a bus request threshold. The microprocessor also includes a comparator, coupled to the register, which generates a prediction of whether the BIU will perform a substantially high level of bus requests on the bus shortly after the prefetch instruction based on a comparison of the bus request threshold and the current level of bus requests. The microprocessor also includes control logic, coupled to the comparator, which prefetches a cache line specified by the prefetch instruction according to a first method if the prediction indicates the BIU will perform a substantially high level of bus requests on the bus in close temporal proximity to the prefetch instruction, and which prefetches the cache line according to a second method otherwise.

In another aspect, it is a feature of the present invention to provide a microprocessor for selectively performing a prefetch instruction specifying a cache line, the microprocessor having a first-level cache and a second-level cache, and a bus interface unit (BIU) for interfacing the caches to a bus coupling the microprocessor to a memory. The microprocessor includes a threshold register, which stores a threshold, and a comparator, coupled to the threshold register, which generates a true value on an output if a number of requests outstanding in the BIU to be performed on the bus is greater than the threshold. If the output is true and the cache line is present in the second-level cache, then the microprocessor transfers the cache line from the second-level cache to the first-level cache only if the cache line in the second-level cache has a status other than shared.

In another aspect, it is a feature of the present invention to provide a microprocessor having first and second cache memories. The microprocessor includes a threshold register, which stores a bus transaction queue depth threshold, and a comparator, coupled to the threshold register, which generates a result. The result is true if the microprocessor has more transactions to perform on a bus coupled to the microprocessor than the bus transaction queue depth threshold. The microprocessor also includes an instruction decoder, which decodes a prefetch instruction specifying a cache line. The microprocessor also includes control logic, coupled to receive the result. If the cache line misses in the first and second cache memories and the result is true, then the control logic forgoes requesting a transaction on the bus to fetch the cache line.

In another aspect, it is a feature of the present invention to provide a method for a processor having level one (L1) and level two (L2) caches to selectively prefetch a cache line specified by a prefetch instruction. The method includes determining whether the cache line hits in the L1 and L2 caches, determining a status of the cache line if the cache line hits in the L2 cache, and determining whether more transactions than a predetermined threshold value are queued by the processor to be transacted on a bus coupled thereto. The method also includes fetching the cache line from system memory if the cache line misses in the L1 and L2 caches and if not more than the threshold value transactions are queued.

An advantage of the present invention is that it potentially makes more efficient use of the processor bus and cache by not allocating prefetch-specified lines to the detriment of subsequent more urgent allocations. The addition of a programmable threshold register used to accomplish the selective prefetching is nominal in terms of both chip real estate and timing, particularly relative to the benefits accrued.

Other features and advantages of the present invention will become apparent upon study of the remaining portions of the specification and drawings.

DETAILED DESCRIPTION

Figure 1:
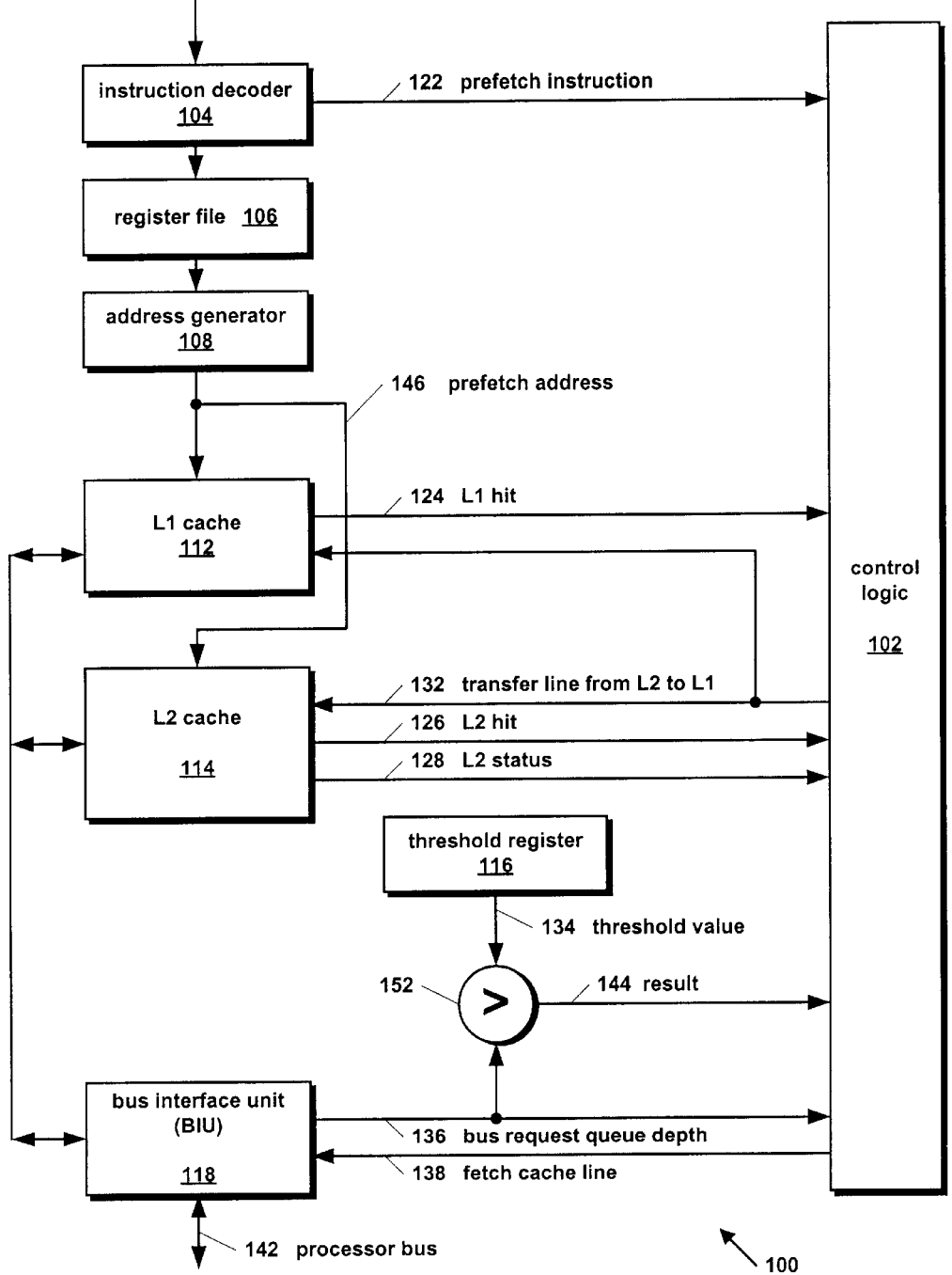
FIG. 1 is a block diagram of a microprocessor according to the present invention.

Referring now to FIG. 1, a block diagram of a microprocessor 100 for performing selective prefetching according to the present invention is shown.

The microprocessor 100 includes control logic 102. Control logic 102 receives and generates various control signals for controlling the microprocessor 100 to selectively prefetch cache lines based on a prediction of future processor bus activity made from the relationship of the current level of processor bus activity to a predetermined threshold level as described below.

The microprocessor 100 also includes an instruction decoder 104 coupled to control logic 102. The instruction decoder 104 receives software program instructions for execution by the microprocessor 100 and decodes the instructions. In particular, the instruction decoder 104 is configured to decode prefetch instructions. The instruction decoder 104 indicates to control logic 102 that it has decoded a prefetch instruction via prefetch instruction signal 122.

The microprocessor 100 also includes a register file 106 coupled to the instruction decoder 104. The register file 106 stores instruction operands. In particular, register file 106 stores operands for calculating prefetch addresses, such as segment descriptors, array indices, offsets, and the like.

The microprocessor 100 also includes an address generator 108 coupled to the register file 106. The address generator 108 generates addresses based on the operands received from register file 106. In particular, address generator 108 generates a prefetch address 146, which is the memory address specified by the prefetch instruction.

The microprocessor 100 also includes a level one (L1) cache 112 coupled to the address generator 108. The L1 cache 112 caches lines of bytes read from memory external to the microprocessor 100 and their corresponding addresses. The L1 cache 112 also maintains status for each of the cache lines. In one embodiment, the L1 cache 112 employs the MESI (Modified, Exclusive, Shared, Invalid) cache coherency protocol. The cache line status maintained by the L1 cache 112 comprises one of the MESI state values. The L1 cache 112 receives the prefetch address 146 from the address generator 108 and generates an L1 hit signal 124 in response thereto. The L1 hit signal 124 is true if the prefetch address 146 hits in the L1 cache 112; otherwise, the L1 hit signal 124 is false. That is, the L1 hit signal 124 is true if the prefetch address 146 is cached in the L1 cache 112 and the address has a valid status. In the MESI embodiment, the valid statuses are Modified, Exclusive, and Shared. The L1 hit signal 124 is provided to control logic 102.

The microprocessor 100 also includes a level two (L2) cache 114 coupled to the L1 cache 112. The L2 cache 114 also caches lines of bytes read from memory external to the microprocessor 100 and their corresponding addresses. The L1 cache 112 is closer than the L2 cache 114 in the cache memory hierarchy to the execution units of the microprocessor 100 that use the cache line data, such as an integer arithmetic logic unit and a floating-point unit, which are not shown in FIG. 1. In one embodiment, the L2 cache 114 is a victim cache of the L1 cache 112. In one embodiment, the L2 cache 114 also employs the MESI cache coherency protocol.

The L2 cache 114 also receives the prefetch address 146 from the address generator 108 and generates an L2 hit signal 126 in response thereto. The L2 hit signal 126 is true if the prefetch address 146 hits in the L2 cache 114; otherwise, the L2 hit signal 126 is false. The L2 hit signal 126 is provided to control logic 102. Additionally, the L2 cache 114 provides the status of a cache line that hits in the L2 cache 114 to control logic 102 on an L2 status signal 128.

The control logic 102 generates a control signal 132 coupled to the L1 cache 112 and the L2 cache 114. Signal 132 instructs the L1 cache 112 to allocate storage to receive a cache line from the L2 cache 114. In particular, the L2 cache 114 selectively transfers to the L1 cache 112 the cache line specified by the prefetch instruction based on signal 132 as described below.

In one embodiment, the L1 cache 112 and L2 cache 114 are write-allocate caches. That is, they allocate a cache line in response to a write miss rather than sending the write transaction to a level in the memory hierarchy farther away from the microprocessor 100 execution units. For example, a write miss in the write-allocate L1 cache 112 allocates a cache line in the L1 cache 112 rather than forwarding the write transaction to the L2 cache 114. Similarly, a write miss in the write-allocate L2 cache 114 allocates a cache line in the L2 cache 114 rather than forwarding the write transaction to system memory.

The microprocessor 100 also includes a bus interface unit (BIU) 118 coupled to the L1 cache 112 and L2 cache 114. The BIU 118 interfaces the other functional blocks of the microprocessor 100, including the L1 cache 112 and L2 cache 114, to a processor bus 142. The processor bus 142 couples the microprocessor 100 to other entities in the system, such as to system memory, or to other devices capable of being masters of the processor bus 142, such as other processors. In one embodiment, the L1 cache 112 comprises an L1 instruction cache and an L1 data cache. In one embodiment, each of the L1 instruction cache, L1 data cache, and the L2 cache 114 are individual bus masters of the processor bus 142 through the BIU 118. Each of the caches is capable of commanding BIU 118 to perform a bus request on processor bus 142.

A bus request, or bus transaction, is a request to perform a transaction on the processor bus 142. Examples of processor bus 142 transactions include read or write transfers of data, such as a cache line specified by a prefetch instruction, between the microprocessor 100 and another system entity, such as system memory. Bus transactions also include cache coherency protocol-related bus cycles, such as a processor notifying other processors that it is claiming ownership of a cache line so that the processor may change the cache status of the line from a shared status to a modified status.

When the BIU 118 receives a command to perform a transaction on the processor bus 142, the BIU 118 queues up the bus request in a queue, or pipeline queue. The BIU 118 maintains a depth, or count, of the current number of outstanding bus requests queued up. The BIU 118 provides the bus request queue depth 136 to control logic 102. In one embodiment, each of the caches 112 and 114 snoops the processor bus 142 to detect a hit of a cache line being accessed by another bus master on the processor bus 142. Finally, BIU 118 receives a signal 138 from control logic 102 instructing the BIU 118 to fetch a cache line from system memory for allocation to the L1 cache 112 or the L2 cache 114.

The microprocessor 100 also includes a programmable threshold register 116. The threshold register 116 stores a threshold value 134. The threshold value 134 may be programmed into the threshold register 116 according to a number of embodiments.

In one embodiment, the threshold register 116 is comprised in a feature control register of the microprocessor 100. Upon reset, the microprocessor 100 initialization microcode programs the feature control register with default values programmed into the microcode during manufacture of the microprocessor 100, including the threshold value 134.

In one embodiment, the microprocessor 100 includes an externally, one-time programmable array of fuses. The fuses may be blown after manufacture of the microprocessor 100 in order to program a mask value into the fuse array for the purpose of altering the default values of the feature control register. After the initialization microcode programs the feature control register with the default values, the microcode reads the fuse array value, exclusive-ORs the default value with the fuse array value, and stores the result into the feature control register. Furthermore, the feature control register is user-visible. Consequently, software executing on the microprocessor 100 may program the threshold value 134 into the threshold register 116 after the microcode has programmed the threshold register 116 during initialization.

In one embodiment, control logic 102 monitors the bus request queue depth 136 and gathers statistics based thereon. The control logic 102 updates the threshold value 134 in the threshold register 116 during run-time operation of the microprocessor 100 based on the statistics gathered.

The microprocessor 100 also includes a comparator 152 coupled to the threshold register 116. The comparator 152 receives the threshold value 134 and the bus request queue depth 136 and compares the two values to generate a result 144 provided to control logic 102. The result 144 is true if the bus request queue depth 136 is greater than the threshold value 134. Otherwise, the result 144 is false. Advantageously, the present invention selectively elects not to prefetch a cache line specified by a prefetch instruction if the comparison result 144 indicates the bus request queue depth 136 is greater than the threshold value 134 unless the cache line hits in the L2 cache 114 with a non-shared status, as described below with respect to FIG. 2. This potentially uses the processor bus 142 more efficiently, particularly when the processor bus 142 is likely to be highly utilized in the near future. The comparison result 144 serves as a predictor of whether the BIU 118 will perform a substantially high level of bus transactions in the near future, i.e., shortly after the prefetch instruction. The prediction enables the control logic 102 to no-op the prefetch instruction if performing the prefetch instruction might delay the performance of subsequent more urgently needed bus transactions, such as for allocating more urgently needed cache lines from memory.

The present inventors have observed that a relationship exists between the previous level of processor bus activity and future processor bus activity. In particular, the present inventors have observed that a previous level of bus activity beyond a statistical threshold is an indication that a workload change has occurred, for example due to a task switch. When a workload change occurs, the microprocessor will likely be needing to use the processor bus for obtaining cache lines from memory associated with the new workload, rather than obtaining the cache line associated with the prefetch instruction. In this situation, it may be advantageous to no-op the prefetch instruction under certain conditions, rather than adding more processor bus transaction requests to the bus interface unit queue.

Based on this observation, the present invention examines the comparison result 144 to employ a different scheme from the conventional method for prefetching when the comparison result 144 indicates a high likelihood that the processor bus activity level in the near future will be high. The following pseudo-code illustrates the prefetching scheme of the present invention.

```
if (line hits in L1) {
        no-op;    /* do nothing */
    } else {
    if (bus request depth > threshold) {
            if (line hits Shared in L2)
                no-op;         /* do nothing */
            else if (line hits Exclusive or Modified in L2)
                transfer line from L2 to L1;
            else
                no-op;         /* do nothing */
    } else {
        if (line hits in L2 cache)
            supply requested line from L2 to L1;
        else
            fetch line from processor bus to L1;
        }
    }
```

As may be observed from the pseudo-code above, the conventional scheme is used if the comparison result 144 does not indicate the processor bus activity in the near future is likely to be high. Otherwise, the present invention no-ops the prefetch instruction unless the prefetch may be satisfied by not generating more processor bus activity, namely by performing an internal transfer of the prefetch-specified cache line from the L2 to the L1, but even then only selectively based upon the cache status of the line in the L2.

Shared cache lines are typically used for read-only lines shared between multiple masters on the processor bus, although shared lines can be written. However, the prefetch instruction does not indicate whether subsequent accesses to the prefetched data will be loads or stores. If a Shared prefetch-specified cache line is moved from the L2 to the L1, but a subsequent access is a store to the line, then the L1 must generate a bus request to the bus interface unit in order to notify the other bus masters that it is claiming ownership of the line to allow an internal transition from the Shared to the Modified state. Consequently, the transfer from the L2 to the L1 will achieve no performance gain since the store cannot complete, i.e., the status cannot be updated, until the ownership-claiming bus request completes. Furthermore, the transfer from the L2 to the L1 might actually harm performance since the transfer might displace a potentially useful line in the L1. Thus, if the prefetch-specified line is Shared in the L2 cache, the line is best left in the L2 rather than transferred to the L1. The present inventors have observed that certain Windows operating system software anomalously bounces Shared cache lines between instruction and data caches, generating such a condition.

Figure 2:
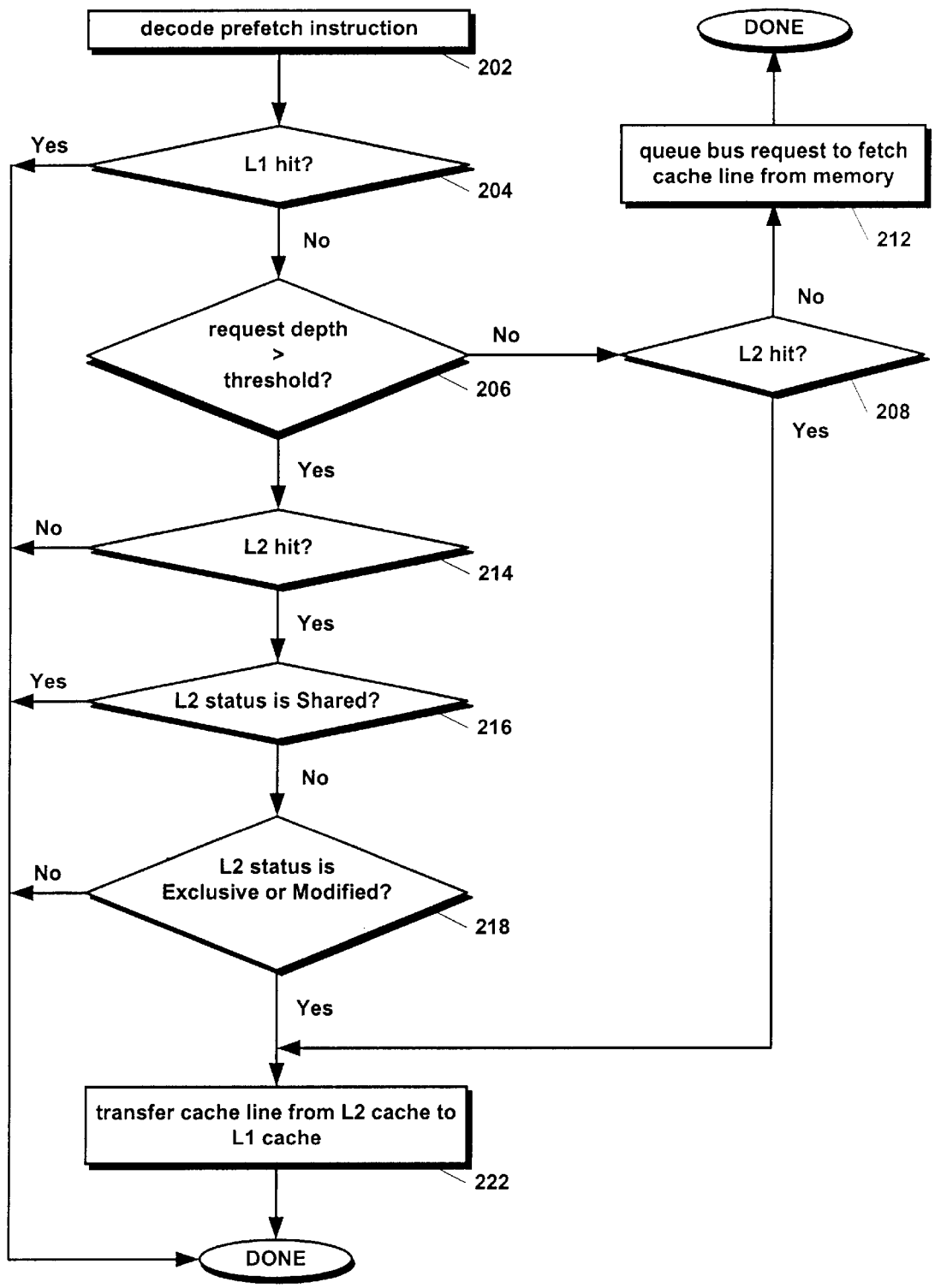
FIG. 2 is a flow chart illustrating operation of the microprocessor of FIG. 1 according to the present invention.

Referring now to FIG. 2, a flow chart illustrating operation of the microprocessor 100 of FIG. 1 according to the present invention is shown. Flow begins at block 202.

At block 202, the instruction decoder 104 decodes a prefetch instruction and notifies control logic 102. Flow proceeds from block 202 to decision block 204.

At decision block 204, the prefetch address 146 is applied to the L1 cache 112 and control logic 102 examines the L1 hit signal 124 to determine whether the L1 hit signal 124 is true, i.e., whether the prefetch address 146 hits in the L1 cache 112. If so, the control logic 102 does not prefetch the specified cache line since it is already cached in the L1 cache 112 and flow ends. Otherwise, flow proceeds to decision block 206.

At decision block 206, control logic 102 examines result 144 to determine whether the bus request queue depth 136 is greater than the threshold value 134. If not, flow proceeds to decision block 208. Otherwise, flow proceeds to decision block 214.

At decision block 208, the prefetch address 146 is applied to the L2 cache 114 and control logic 102 examines the L2 hit signal 126 to determine whether the L2 hit signal 126 is true, i.e., whether the prefetch address 146 hit in the L2 cache 114. If not, flow proceeds to block 212. Otherwise, flow proceeds to block 222.

At block 212, control logic 102 commands BIU 118 via control signal 138 to queue up a bus request to fetch the cache line specified by the prefetch instruction that is missing in both the L1 cache 112 and L2 cache 114. Advantageously, control logic 102 fetches the cache line because the processor bus 142 is not likely to be highly utilized in the near future, as indicated by the fact that the bus request queue depth 136 is not greater than the threshold value 134. Flow ends at block 212.

At decision block 214, control logic 102 examines the L2 hit signal 126 to determine whether the L2 hit signal 126 is true, i.e., whether the prefetch address 146 hit in the L2 cache 114. If not, the control logic 102 advantageously does not prefetch the specified cache line since the processor bus 142 is likely to be highly utilized in the near future as indicated by the fact that the bus request queue depth 136 is greater than the threshold value 134; thus flow ends. Otherwise, flow proceeds to decision block 216.

At decision block 216, control logic 102 examines the L2 status 128 to determine whether the status of the cache line specified by the prefetch instruction is Shared. If so, control logic 102 advantageously does not transfer the cache line from the L2 cache 114 to the L1 cache 112 for the reasons discussed above; thus flow ends. Otherwise, flow proceeds to decision block 218.

At decision block 218, control logic 102 determines whether the L2 status 128 is either Exclusive or Modified. If the L2 status 128 has a value of either Exclusive or Modified, then flow proceeds to block 222. Otherwise, the cache line is invalid, and the control logic 102 advantageously does not prefetch the specified cache line since the processor bus 142 is likely to be highly utilized in the near future as indicated by the fact that the bus request queue depth 136 is greater than the threshold value 134; thus flow ends.

At block 222, control logic 102 generates a true value on control signal 132 to instruct the L2 cache 114 to transfer the prefetch-specified cache line therein to the L1 cache 112. That is, the L1 cache 112 allocates space for the cache line specified by the prefetch instruction, receives the line from the L2 cache 114, and stores the line into the allocated space. Flow ends at block 222.

Although the present invention and its objects, features, and advantages have been described in detail, other embodiments are encompassed by the invention. For example, the present invention is adaptable to microprocessors having a variety of instruction sets and cache hierarchy structures. Additionally, the present invention is adaptable to caches employing other cache coherency schemes besides the MESI protocol. Finally, the present invention is adaptable to a variety of processor bus architectures and threshold values.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor for selectively performing a prefetch instruction, comprising:
   a bus interface unit (BIU), for performing bus transactions on a bus coupling the microprocessor to a memory;
   a predictor, coupled to said BIU, for generating a prediction of whether prefetching a cache line specified by the prefetch instruction will delay subsequent bus transactions on said bus; and
   control logic, coupled to said predictor, for selectively not prefetching said cache line if said prediction indicates prefetching said cache line will delay said subsequent bus transactions.

2. The microprocessor of claim 1, further comprising:
   a threshold register, coupled to said predictor, for storing a predetermined threshold value;
   wherein said predictor generates said prediction based on a comparison of said threshold value with a number of bus transactions queued to be performed on said bus by said BIU.

3. The microprocessor of claim 2, wherein if said number of queued bus transactions is greater than said threshold value, then said prediction predicts prefetching said cache line will delay said subsequent bus transactions.

4. The microprocessor of claim 1, wherein said prefetching said cache line specified by the prefetch instruction comprising fetching said cache line from said memory.

5. The microprocessor of claim 1, wherein said subsequent bus transactions are for allocating other cache lines from the memory.

6. The microprocessor of claim 1, wherein said predetermined threshold value stored in said threshold register is software programmable.

7. The microprocessor of claim 1, wherein said predetermined threshold value stored in said threshold register is programmable during manufacturing of the microprocessor.

8. A microprocessor for selectively performing a prefetch instruction, comprising:
   a bus interface unit (BIU), for indicating a current level of bus requests for said BIU to perform on a bus coupling the microprocessor to a memory;
   a register, coupled to said BIU, for storing a bus request threshold;
   a comparator, coupled to said register, for generating a prediction of whether said BIU will perform a substantially high level of bus requests on said bus shortly after the prefetch instruction based on a comparison of said bus request threshold and said current level of bus requests; and
   control logic, coupled to said comparator, for prefetching a cache line specified by the prefetch instruction according to a first method if said prediction indicates said BIU will perform a substantially high level of bus requests on said bus in close temporal proximity to the prefetch instruction, and prefetching said cache line according to a second method otherwise.

9. The microprocessor of claim 8, further comprising:
   first- and second-level caches, coupled to said control logic, wherein said first method comprises not fetching said cache line from the memory if said cache line misses in said first- and second-level caches.

10. The microprocessor of claim 9, wherein said second method comprises fetching said cache line from the memory into at least one of said first- and second-level caches if said cache line misses in said first- and second-level caches.

11. The microprocessor of claim 9, wherein said first method further comprises transferring said cache line from said second-level cache to said first-level cache if said cache line hits in said second-level cache and if said cache line has a non-shared status in said second-level cache.

12. The microprocessor of claim 9, wherein said first method further comprises transferring said cache line from said second-level cache to said first-level cache if said cache line hits in said second-level cache and if said cache line has a modified status or exclusive status in said second-level cache.

13. The microprocessor of claim 8, wherein said predetermined threshold value stored in said threshold register is programmable.

14. A microprocessor for selectively performing a prefetch instruction specifying a cache line, the microprocessor having a first-level cache and a second-level cache, and a bus interface unit (BIU) for interfacing the caches to a bus coupling the microprocessor to a memory, the microprocessor comprising:
   a threshold register, for storing a threshold; and
   a comparator, coupled to said threshold register, for generating a true value on an output if a number of requests outstanding in the BIU to be performed on the bus is greater than said threshold;
   wherein if said output is true and the cache line is present in the second-level cache, then the microprocessor transfers the cache line from the second-level cache to the first-level cache only if the cache line in the second-level cache has a status other than shared.

15. The microprocessor of claim 14, wherein if said output is not true, then the microprocessor transfers the cache line from the second-level cache to the first-level cache if the cache line is present in the second-level cache.

16. The microprocessor of claim 15, wherein if said output is not true, then the microprocessor fetches the cache line from the memory to at least one of the caches if the cache line is not present in either of the caches.

17. The microprocessor of claim 16, wherein if said output is true, then the microprocessor does not fetch the cache line from the memory if the cache line is not present in either of the caches.

18. The microprocessor of claim 14, wherein the microprocessor employs a write-allocate cache protocol.

19. The microprocessor of claim 14, wherein said threshold is programmable in said threshold register.

20. The microprocessor of claim 14, wherein the prefetch instruction is a Pentium III-compatible PREFETCH instruction.

21. The microprocessor of claim 14, wherein the prefetch instruction is a 3DNOW-compatible PREFETCH instruction.

22. A microprocessor having first and second cache memories, the microprocessor comprising:
    a threshold register, for storing a bus transaction queue depth threshold;
    a comparator, coupled to said threshold register, for generating a result, wherein said result is true if the microprocessor has more transactions to perform on a bus coupled to the microprocessor than said bus transaction queue depth threshold;
    an instruction decoder, for decoding a prefetch instruction specifying a cache line; and
    control logic, coupled to receive said result, wherein if said cache line misses in the first and second cache memories and said result is true, then said control logic forgoes requesting a transaction on said bus to fetch said cache line.

23. The microprocessor of claim 22, wherein if said cache line hits in the second cache memory with a shared status, then said control logic causes said cache line to be transferred from the second cache memory to the first cache memory only if said result is not true.

24. The microprocessor of claim 22, wherein said bus transaction queue depth threshold is programmable.

25. A method for a processor having level one (L1) and level two (L2) caches to selectively prefetch a cache line specified by a prefetch instruction, the method comprising:
    determining whether the cache line hits in the L1 and L2 caches;
    determining a status of the cache line if the cache line hits in the L2 cache;
    determining whether more transactions than a predetermined threshold value are queued by the processor to be transacted on a bus coupled thereto; and
    fetching the cache line from system memory if the cache line misses in the L1 and L2 caches and if not more than said threshold value transactions are queued.

26. The method of claim 25, further comprising:
    transferring the cache line from said L2 cache to said L1 cache if the cache line misses in the L1 cache, if the cache line hits in the L2 cache with a shared status, and if not more than said predetermined threshold value transactions are queued.

27. The method of claim 25, further comprising:
    transferring the cache line from said L2 cache to said L1 cache if the cache line misses in the L1 cache, and if the cache line hits in the L2 cache with an exclusive or modified status.

28. The method of claim 25, further comprising:
    programming said threshold value into a threshold register.

29. The method of claim 28, wherein said programming said threshold value into said threshold register is performed prior to said determining whether more transactions than said threshold value are queued.

30. The method of claim 28, wherein said programming said threshold value into said threshold register is performed during manufacture of the processor.

31. The method of claim 30, wherein said programming said threshold value into said threshold register comprises programming fuses blown during manufacturing of the microprocessor.

32. The method of claim 28, wherein said programming said threshold value into said threshold register is performed by microcode in the processor after the processor is reset.

33. The method of claim 28, wherein said programming said threshold value into said threshold register is performed by a software program executed by the microprocessor.

34. The method of claim 28, wherein said programming said threshold value into said threshold register comprises:
    gathering statistics of said transactions queued by the processor to be transacted on said bus during run-time operation of the microprocessor; and
    updating said threshold value in said threshold register based on said gathering of said statistics.

* * * * *